(12) United States Patent
Hilt

(10) Patent No.: US 9,153,056 B2
(45) Date of Patent: Oct. 6, 2015

(54) ADAPTIVE AND FAST IMAGE COLLAGE CREATION

(71) Applicant: Shutterfly, Inc., Redwood City, CA (US)

(72) Inventor: Noah Christopher Hilt, Brooklyn, NY (US)

(73) Assignee: Shutterfly, Inc., Redwood City, CA (US)

(*) Notice: Subject to any disclaimer, the term of this patent is extended or adjusted under 35 U.S.C. 154(b) by 0 days.

(21) Appl. No.: 13/959,974

(22) Filed: Aug. 6, 2013

(65) Prior Publication Data

US 2014/0307980 A1    Oct. 16, 2014

Related U.S. Application Data

(60) Provisional application No. 61/774,308, filed on Mar. 7, 2013.

(51) Int. Cl.
G06K 9/36 (2006.01)
G06T 11/60 (2006.01)

(52) U.S. Cl.
CPC ........................................ *G06T 11/60* (2013.01)

(58) Field of Classification Search
None
See application file for complete search history.

(56) References Cited

U.S. PATENT DOCUMENTS

| | | | | |
|---|---|---|---|---|
| 7,576,755 | B2* | 8/2009 | Sun et al. | 345/629 |
| 8,090,196 | B2* | 1/2012 | Kojima et al. | 382/162 |
| 2006/0104542 | A1* | 5/2006 | Blake et al. | 382/284 |
| 2009/0116752 | A1* | 5/2009 | Isomura et al. | 382/217 |
| 2009/0169132 | A1* | 7/2009 | Sagawa | 382/295 |
| 2009/0263038 | A1* | 10/2009 | Luo et al. | 382/254 |
| 2010/0080490 | A1* | 4/2010 | Akiyama | 382/294 |
| 2012/0027294 | A1* | 2/2012 | Krolczyk et al. | 382/165 |
| 2012/0294514 | A1* | 11/2012 | Saunders et al. | 382/159 |
| 2013/0101210 | A1* | 4/2013 | Tang | 382/165 |
| 2014/0282009 | A1* | 9/2014 | Avrahami | 715/730 |

\* cited by examiner

*Primary Examiner* — Bhavesh Mehta
*Assistant Examiner* — Feng Niu
(74) *Attorney, Agent, or Firm* — Xin Wen

(57) ABSTRACT

A computer-implemented method for creating an image collage includes automatically selecting a first image from the group of images that best fits image-collage template based on predetermined criteria, placing and fitting the first image in the image-collage template, automatically selecting one or more additional images from the group of images that best fits the image-collage template including one or more already placed images that include the first image, and placing and fitting the one or more additional images image in the image-collage template by the computer system. An image collage is formed after all images in the group are placed in the image-collage template.

20 Claims, 8 Drawing Sheets

Fig. 4A
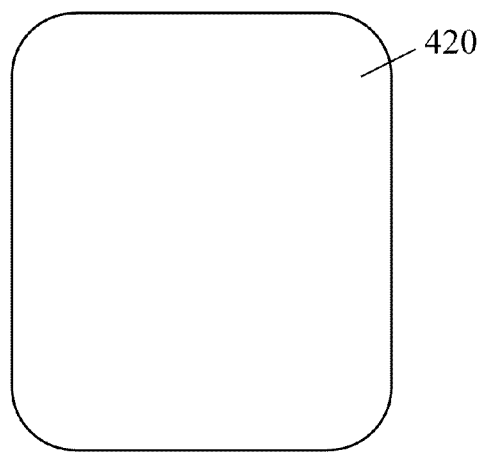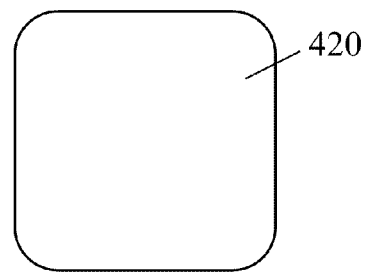
Fig. 4C
Fig. 4B
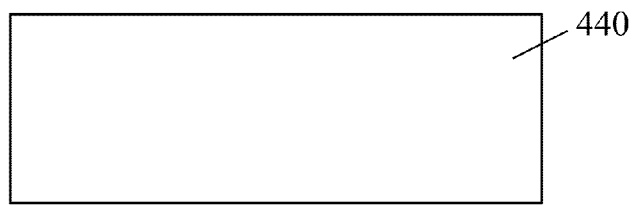
Fig. 4D

ADAPTIVE AND FAST IMAGE COLLAGE CREATION

TECHNICAL FIELD

This application relates to utilization of digital images, and more specifically, to the design and creation of products incorporating digital images.

BACKGROUND OF THE INVENTION

Digital images can be stored in user's computers and viewed on electronic display devices. Users can upload digital images to a central network location provided by image service providers such as Shutterfly, Inc. Such image service providers can enable users to store, organize, manage, edit, enhance, and share digital images at the central network location using a web browser or other software applications. A user can also design and personalize image-based products, and order the image-based products from the image service provider. Examples of the image-based products include image prints, photo books, photo calendars, photo greeting cards, holiday cards, photo stationeries, photo mugs, and photo T-shirts, which incorporate image content provided by the user or the image service provider.

The proliferation of mobile devices such as camera phones and tablet computers enables an increasing number of users to take pictures, share photos, post photos online, and create personalized photo products or projects. Creating personalized image products, however, can take considerable amount of time and effort. Additionally, it is challenging to personalize image products using mobile devices because these devices often have smaller displays, lower communication bandwidth, and possibly have lower computing power comparing to desk computers. Users of mobile devices also tend to have shorter attention span than users of desktop or laptop computers.

There is therefore a need for more convenient methods and tools to assist users to create personalized image projects, image products, and designs, especially on mobile devices.

SUMMARY OF THE INVENTION

The present application disclosed a novel computer-implemented method for creating image collages. The disclosed method is fast, which can be very beneficial for applications on mobile devices such as smart phones. The disclosed method breaks down a potentially complex computation problem into a series of simpler steps. In the disclosed method, the image collage can incorporate different numbers of images. The disclosed method is adaptive to different image-collage form factors, which makes the disclosed method applicable to different image products and image project designs.

In one general aspect, the present invention relates to a computer-implemented method for creating an image collage. The method includes allowing an image-collage template to be identified, automatically selecting, by the computer system, a first image from a group of images that best fits image-collage template based on one or more predetermined criteria, fitting the first image in the image-collage template by the computer system, wherein the first image is placed in the image-collage template, automatically selecting based on predetermined criteria, by the computer system, one or more additional images from the group of images that best fit the image-collage template including one or more already placed images in the image-collage template, wherein the one or more placed images comprise the first image; and fitting the one or more additional images in the image-collage template by the computer system, wherein an image collage is formed after all images in the group are placed in the image-collage template.

Implementations of the system may include one or more of the following. The predetermined criteria can specify that a best fit for the first image in the image-collage template is obtained when the first image, among the group of images, has the closest aspect ratio as the image-collage template. The one or more already placed images in the image-collage template can serve as an initial spatial condition for the placements of the one or more additional images. The step of fitting the one or more additional images in the image-collage template can include cropping one or more already placed images in the image-collage template to allow fittings of the one or more additional images in the image-collage template. The computer-implemented method can further include: repeating the step of automatically selecting based on predetermined criteria, by the computer system, one or more images from the group of images and the step of fitting the one or more images image in the image-collage template until all images in the group are placed in the image-collage template. The computer-implemented method can further include: automatic adjusting the one or more additional images and the one or more placed images after the step of automatically selecting, based on predetermined criteria, one or more additional images from the group of images by the computer system. The computer-implemented method can further include: allowing a user to adjust images in the image collage after all images in the group are placed in the image-collage template. The computer-implemented method can further include identifying at least one of a face or an object in the first image or the one or more additional images; and cropping the first image or the one or more additional images based on position and size of the face or the object before the first image is placed in the image-collage template. The predetermined criteria can include at least one of image aspect ratio, image resolution, or image qualities of the images in the group. The group of images can be selected by a user. The group of images can be automatically selected by the computer system. The image-collage template can be defined by dimensions of an image product or image application. The image-collage template can be selected by a user. The image-collage template can be automatically selected by the computer system. The computer system can include a mobile device. The computer-implemented method can further include incorporating the image collage into an image product or an image application. The image product can include a photobook, a photo greeting card, photo stationery, a phone case, a photo mug, an image print, a photo magnet, a photo coaster, or a photo mouse pad. The first image can be removed from the group of images after the first image is placed in the image-collage template.

In one another aspect, the present invention relates to a computer-implemented method for creating an image collage includes allowing a sequence to be defined in a group of images; allowing an image-collage template to be identified; automatically selecting a first image in the sequence from the group of images by a computer system; fitting the first image in the image-collage template by the computer system, wherein the first image is placed in the image-collage template; automatically selecting, based on the sequence, one or more additional images from the group of images to best fit the image-collage template including one or more already placed images, wherein the one or more placed images comprise the first image; and fitting the one or more additional images in the image-collage template by the computer system, wherein an image collage is formed after all images in the group are placed in the image-collage template.

These and other aspects, their implementations and other features are described in detail in the drawings, the description and the claims.

BRIEF DESCRIPTION OF THE DRAWINGS

FIGS. 4A-4D show exemplified image-collage templates.

DETAILED DESCRIPTION OF THE INVENTION

Figure 1:
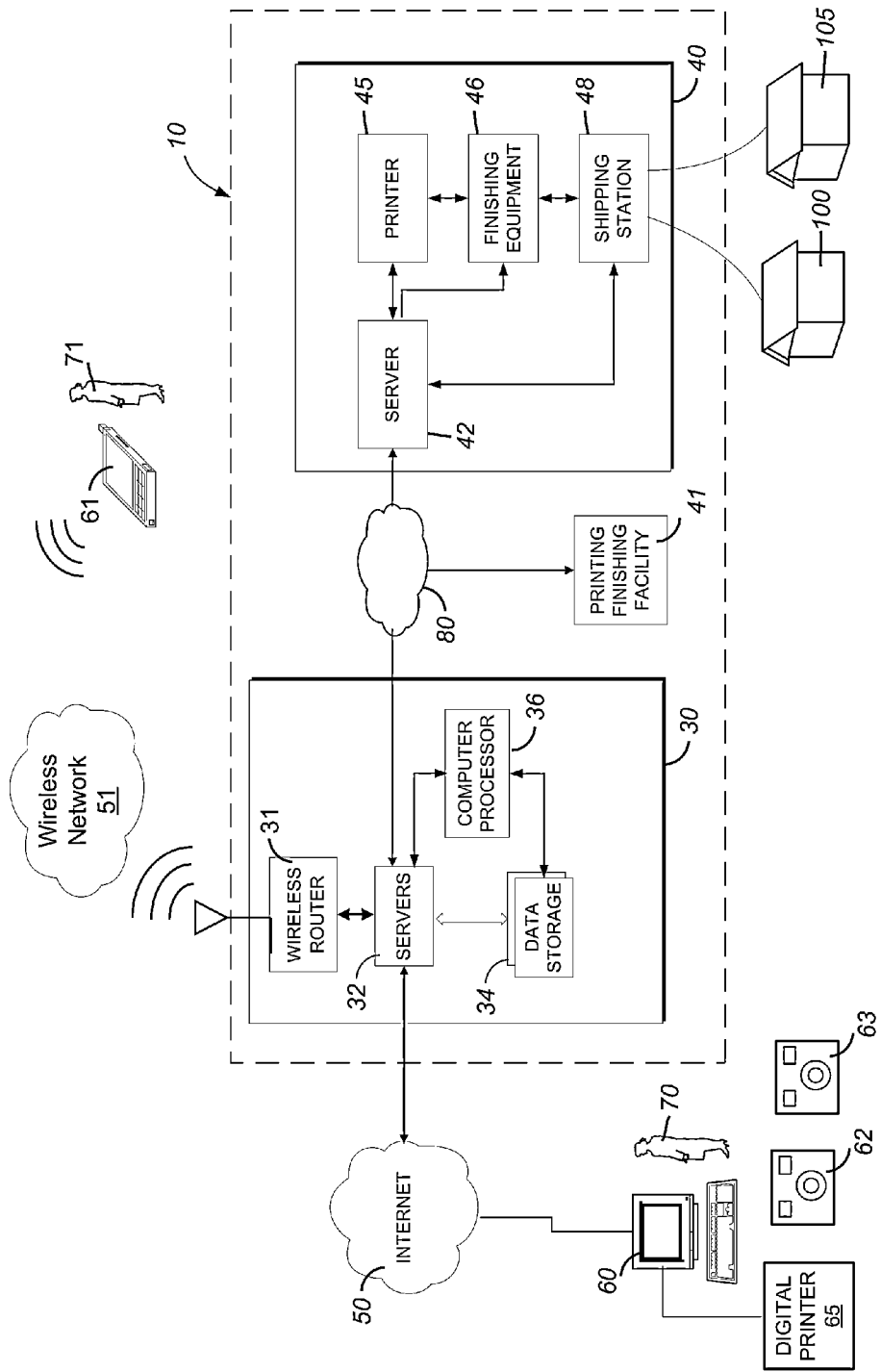
FIG. 1 is a block diagram of a network-based imaging service system compatible with the present invention.

Referring to FIG. 1, an imaging service system 10 can enable users 70, 71 to organize and share images via a wired network or a wireless network 51. Optionally, the imaging service system 10 can also fulfill image products for the users 70, 71. The imaging service system 10 includes a data center 30, one or more product fulfillment centers 40, 41, and a computer network 80 that facilitates the communications between the data center 30 and the product fulfillment centers 40, 41.

The data center 30 can include a server 32 for communicating and receiving input from the users 70, 71, a data storage device 34 for storing user data, image and design data, and a computer processor 36 for rendering images, organizing images, and processing orders. The user data can include account information, discount information, and order information associated with the user. A website can be powered by the servers 32 and can be accessed by the user 70 using a computer device 60 via the Internet 50, or by the user 71 using a wireless device 61 via the wireless network 51.

The imaging service system 10 allows users to design and personalize their products. In the present disclosure, the term "personalized" refers to the information that is specific to the recipient, the user, the gift product, and the occasion, which can include personalized content, personalized text messages, personalized images, and personalized designs that can be incorporated in the image products. The content of personalization can be provided by a user or selected by the user from a library of content provided by the service provider. The term "personalized information" can also be referred to as "individualized information" or "customized information".

Personalized image products can include users' photos, personalized text, personalized designs, and content licensed from a third party. Examples of personalized image products may include photo books, personalized greeting cards, photo stationery, photo or image prints, photo posters, photo banners, photo playing cards, photo T-shirts, photo mugs, photo aprons, photo magnets, photo mouse pads, a phone case, a case for a tablet computer, photo key-chains, photo collectors, photo coasters, photo banners, or other types of photo gift or novelty item. Photo book generally refers to as bound multi-page product that includes at least one image on a book page. Photo books can include photo albums, scrapbooks, bound photo calendars, or photo snap books, etc. The image products each can include a single page or multiple pages. Each page can include one or more images, text, and design elements. Some of the images may be laid out in an image collage.

The user 70 or her family may own multiple cameras 62, 63. The user 70 transfers images from cameras 62, 63 to the computer device 60. The user 70 can edit, organize images from the cameras 62, 63 on the computer device 60. The computer device 60 can be in many different forms: a personal computer, a laptop, or tablet computer, a mobile phone etc. The camera 62 can include a camera that is integrated with or built-in in the computer device 60. The user 70 can also print pictures using a printer 65 and make image products based on the images from the cameras 62, 63. The cameras 62, 63 can include a digital camera, a camera phone, a video camera capable of taking still images, or an image capture device installed on a laptop computer or a tablet computer. The images from the cameras 62, 63 can be uploaded to the server 32 to allow the user 70 to organize and render images at the website, share the images with others, and design or order image product using the images from the cameras 62, 63 or elsewhere.

Examples of wireless device 61 include a mobile phone, a tablet computer, or a laptop computer, personal digital assistant, etc. The wireless device 61 can include a built-in camera (e.g. in the case of a camera phone). The images taken by the user 71 using the wireless device 61 can also be uploaded to the data center 30. If users 70, 71 are members of a family or associated in a group (e.g. a soccer team), the images from the cameras 62, 63 and the mobile device 61 can be grouped together to be incorporated into an image product such as a photo book, or used in a blog page for an event such as a soccer game.

Once an image product design is created, a user can order it from the image service provider. The image product design and associated data can be transmitted to the server 42 in the product fulfillment center 40. The image product can be printed by a printer 45, finished by finishing equipment 46, and shipped to locations 100, 105 from shipping station 48. The finished image products can be shipped to the user herself, or as gifts to other recipients.

Although large numbers of photos are frequently captured by various devices, only a small fraction of the digital images are used in customized imaging products. This diversion becomes especially prominent in mobile devices: a vast majority of photos captured by smart camera phones are not used in creative image products or image project designs. Such diversion is caused in part by a lack of tools to assist users to quickly create personalized image product designs such as image collages in a small display, short user-attention, and often low communication-bandwidth environment.

Figure 2:
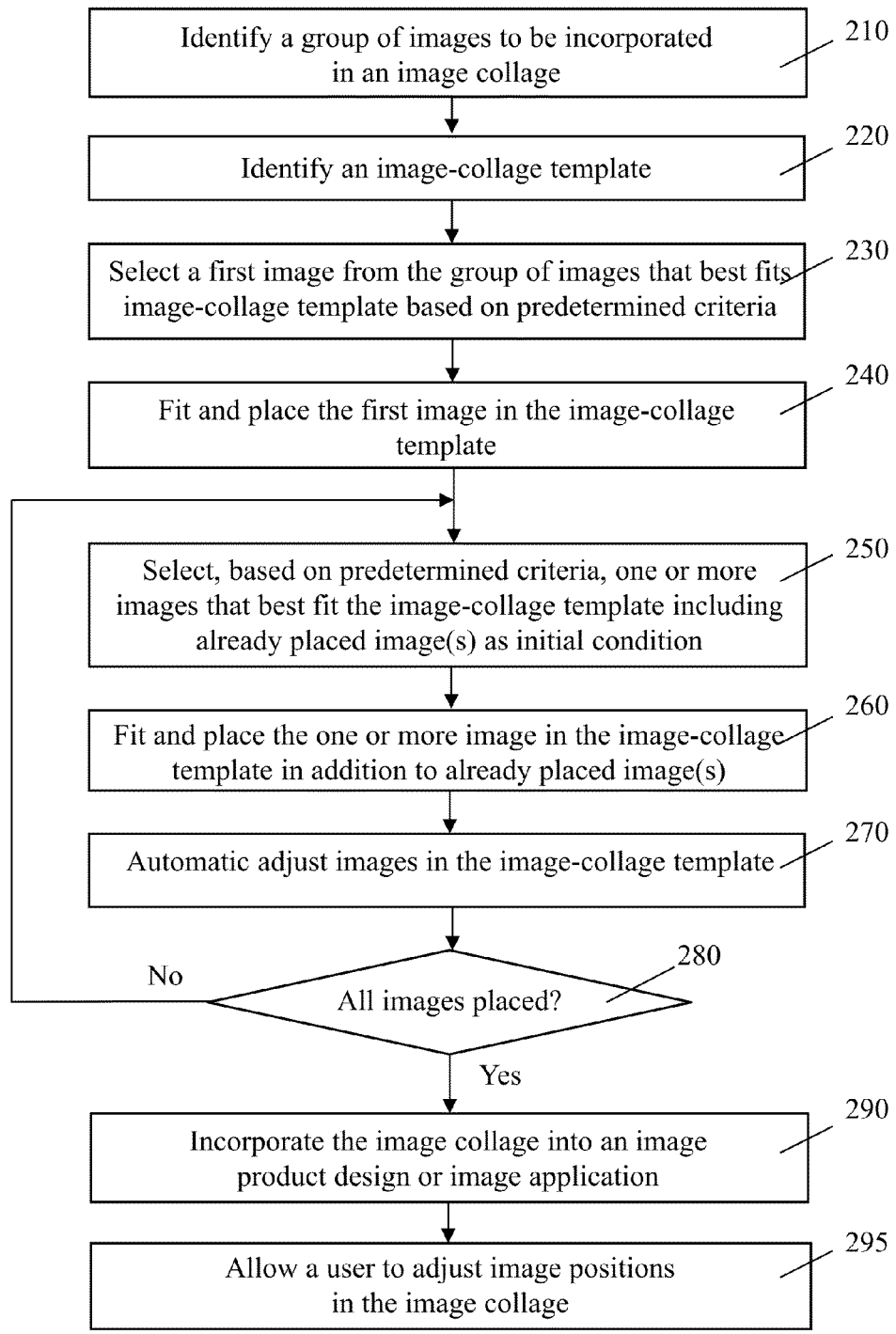
FIG. 2 shows an automated process for creating an image collage in accordance to the present invention.
Figure 3:
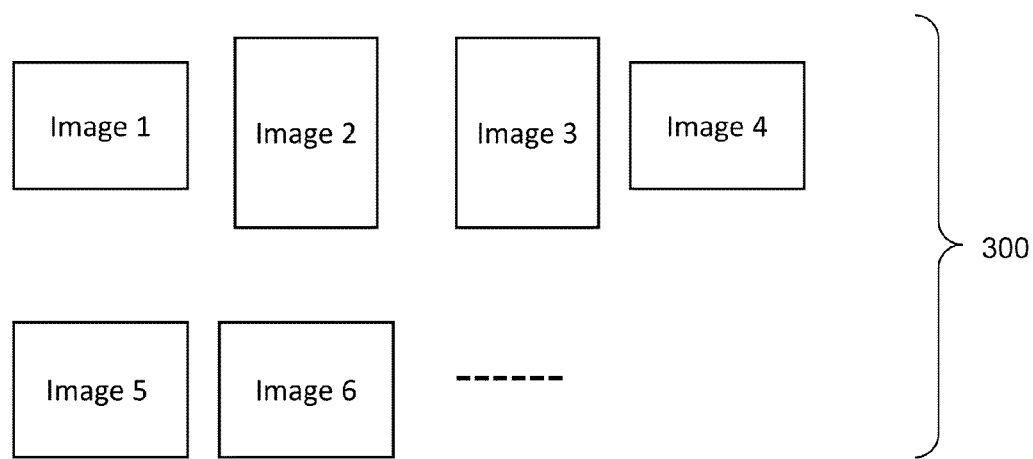
FIG. 3 shows a group of images to be placed in an image collage.

In some embodiments, referring to FIGS. 2 and 3, an image collage can be created in a computer-implemented method by one or more of the following steps: first, a group of images 300 are identified by a user or a computer (step 210). The group of images are to be incorporated in an image collage. The group of images 300 (e.g. Image 1, Image 2 . . . Image 6) can be stored in a computer device 60, a wireless device 61, or at a data center 30. The group of images can include 2, 3, 4, 5, 6, or other numbers of multiple images.

Referring to FIGS. 2, 4A-4D, an image-collage template is identified (step 220). The image-collage templates 410, 420, 430, 440 may be intended to be used in image product or design such as a photo greeting card (e.g. 410), a photo mouse page (e.g. 420), a photo coaster (e.g. 430), a photo mug (e.g. 440), a photo case for a smart phone, one page or two opposing pages of a photobook, photo stationery, or an image on a web page or a blog page at a website. The form factors such as size, shape, aspect ratio (e.g. width-to-height ratio), etc. of the image-collage templates 410-440 are determined by the sizes and shapes of image products or image designs into which the image collages are to be incorporated. For example, a 14" by 11" canvas print in a landscape format has a much larger aspect ratio (width-to-height ratio) than a 5" by 9" phone case (in a portrait format). Collages having different aspect ratios and sizes require different layouts of images, that is, collage designs.

In one aspect, the group of images an image product or image application are selected by a user. The image-collage template can be selected by the user, or automatically identified based on user selections. In another aspect, an image product or image application as well as the image-collage template are automatically selected by a computer system, which can proactively present an image product or image application comprising a below described image collage to a user.

Automated image collage can be a complex mathematical problem because of a large number of parameters involved: the shapes of the image collage templates, the number of images to be incorporated, the formats and sizes of the images, etc. Creating an image collage that is aesthetically pleasing requires optimizing the above and many other parameters such as the optional cropping of the images and color or image content matching between the images in a same image collage, etc. Optimizing these parameters may lead to local minima (or maxima). However, it is difficult to computationally determine a global minimum (maximum) if it exists at all.

Figure 5A:
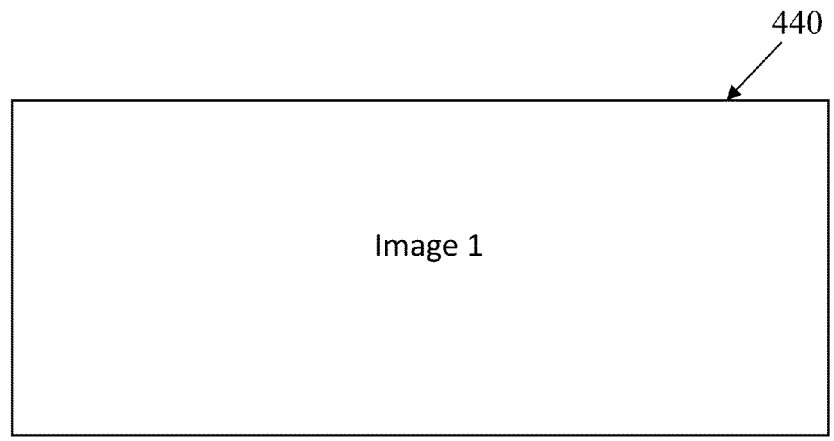
FIGS. 5A-5D illustrate placements of images in an image collage based on predetermined criteria in accordance to the present invention.

In one aspect, the presently disclosed method breaks down a potentially complex problem into multiple sequential steps that each relies on its previous steps as initial spatial condition. First, a first image is selected from the list of images that best fits the image-collage template based on predetermined criteria (step 230). In one aspect, the predetermined criteria can be based in part on the aspect ratios of the images. For example, as illustrated in FIGS. 3 and 5A, among the group of images, Image 1 is determined to have (the most) similar aspect ratio to the image template 440 and thus fit the image template 440 the best. As shown in FIGS. 3, 5A, both Image 1 and the image collage 440 have landscape format (i.e. width bigger than height) with similar aspect ratios. When several images have equal or similar aspect ratios and/or dimensions, additional criteria can be used to rate the similar images: for example, image resolution and image contents or image qualities can be used to evaluate and compare images. Since the first image tends to be more prominent in the final image collage, a higher resolution image may be preferred among images of the same aspect ratios. The images can also be cropped to emphasize the main objects before such comparisons. For example, faces and other significant objects (e.g. landmark, objects that identify an occasion, etc.) in the images can be identified, which can guide at least some of the similar images to be cropped to emphasize the faces and the significant objects in the similar images. The cropped images usually have different aspect ratios and thus different degrees of fitting to the image template 440. Moreover, image quality factors such as color vibrancy, sharpness (i.e. blurriness), contrast, lightness, intensity balance, existences or lack of over or under exposures, etc. can be evaluated. The image of higher qualities can be chosen among a few similar images to be the first image to be placed in an image collage template because the first image tends to be more prominent in the final image collage.

Figure 6:
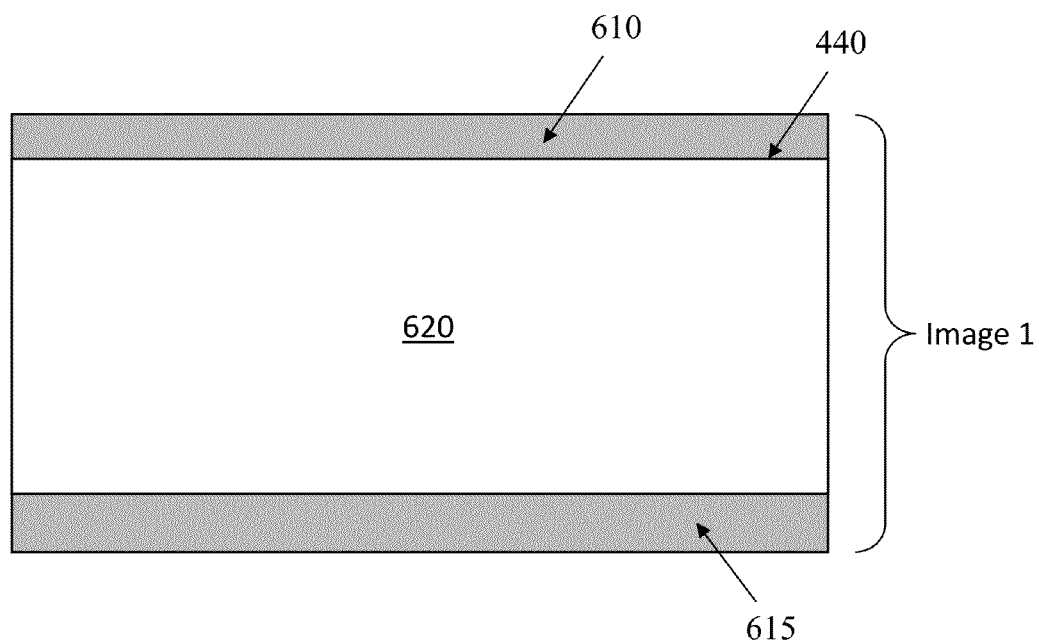
FIG. 6 shows an image that includes cropped off portions and a portion selected to be incorporated in an image-collage template as shown in FIG. 5A.

The first selected image is fitted and placed in the image collage template (step 240). The first image may or may not fill the whole area of the image template 440. The first image is then removed from the group of images for further selections. Portion of the first image may be cropped because the first image may not have exactly the same aspect ratio as the image template 440. As shown in FIG. 6, when the width of Image 1 is scaled to the width of the image template 440, the image height is larger than that of the image template 440. As a result, image portions 610, 615 are cropped off while an image portion 620 in Image 1 is incorporated in the image template 440. The position of the incorporated image portion 620 can be determined by the objects identified in the Image 1. For example, if a face is close to the upper edge, the incorporated image portion 620 can be positioned higher and closer the upper edge of Image 1, resulting in a smaller cropped image portion 610 on the top than the cropped image portion 615 in the bottom.

Figure 5B:
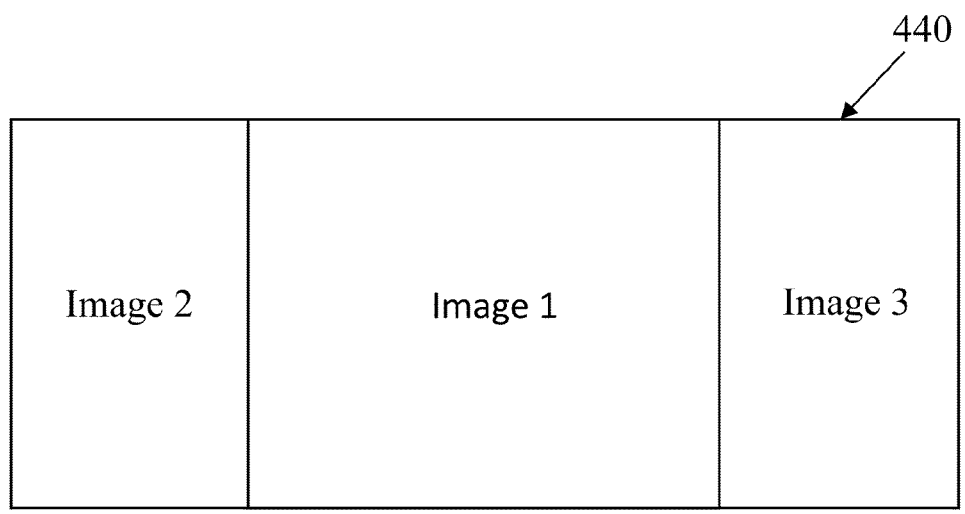

Next, one or more additional images are selected from the remaining images in the group, which best fit image-collage template that includes already placed image(s) (step 250). As an example, as shown in FIGS. 3, 5A, and 5B, Image 2 and Image 3 are determined to best fit the image template including Image 1. In other words, Image 1 is part of an initial spatial condition for the placements of Image 2 and Image 3. The predetermined criteria for the image selection can include, as described above, aspect ratios, image resolutions, cropping, image qualities, etc.

Importantly, the prior placed image(s) (e.g. Image 1) serve as an initial spatial condition for the newly selected images. In other words, the selections of placement of new images are also based on the location and dimension of already placed image(s) (e.g. Image 1). The one or more additional images (e.g. Image 2 and Image 3) are fitted and placed in the image collage template in addition to already placed image(s) (step 260). The constraint of having Image 1 already placed in the image collage simplifies the placement options for Image 2 and Image 3.

The prior placed image(s) (e.g. Image 1) and the newly placed images (e.g. Image 2 and Image 3) are automatically adjusted (step 270) in aspect ratios, sizes, and optionally overlay areas to make them fit better and look more appealing. The automatic adjustment can be based on relation portions and balances among the prior placed image(s) and the newly placed images. In comparing FIG. 5B with FIG. 5A, Image 1 can be cropped specifically to accommodate the fittings of Image 2 and Image 3 with Image 1 in the image collage 440. As shown in FIG. 5B, the portrait formats of Image 2 and Image 3 allow them to fit well to the sides of Image 1 (in landscape format) in the image collage template 440.

Figure 5C:
Figure 5D:

Next, it is checked if all the images in the group intended to be placed in the image collage have been placed (step 280). If not, steps 250-270, are repeated until all images in the group are placed into the image collage template. As described above, the prior placed image (e.g. Image 1) serves as an initial spatial condition for the newly selected images. The selections of the additional images are based on predetermined criteria such as aspect ratios, image resolutions, cropping, image qualities, etc. For example, as shown in FIGS. 5C-5D, Image 4, Image, 5, Image 6 are sequentially placed in the image collage template 440. As Image 4 is inserted into the image collage template 440 (step 270), as shown in FIG. 5C, Image 1 is adjusted to accommodate Image 4 in the image collage template 440. Image 1 is reduced in vertical dimension, and certain portion may be cropped off. Similarly, when Image 5 and Image 6 are added to the image collage template 440, as shown in FIG. 5D, Image 2 and Image 3 are respectively adjusted to accommodate Image 5 and Image 6. In steps 270, the already placed Image 1-4 provide a constraint to where Image 4 can be fittingly and aesthetically placed in the image-collage template 440, which significantly simplifies the possibilities and computation complexity. The already placed Image 1-4 provide initial spatial conditions for Image 5-6 and thus limit their placement possibilities, which also accelerate determination of Image 5-6 by a computer.

In summary, the sequential placements of images using previously placed images as initial spatial conditions significantly narrows down placement choices, and thus can accelerate computer efficiency by orders of magnitude.

If it is determined all images in the group are placed in the image collage, the image collage is incorporated into design of an image product or image application (step 290). As stated above, the image product can include hardcopy products such as photo case of a smart phone, photo magnet, photo coaster, a photo greeting cards, or calendar. An image application can include digital presentations such as a web page, a blog page, a portion of a photo story, etc. Optionally, a user is allowed to adjust the images in the image collage (step 295). The user can adjust sizes and relative proportions of the images as well as swapping positions of the images in the image collage. The user adjustment can be achieved by I/O devices such as a computer mouse or by touch movements over a touch sensitive screen. The sequence of steps 290 and 295 can be switched.

In one aspect, the presently disclosed image collage creation method breaks a complex optimization computation down to multiple sequential steps of placing and fitting images into an image collage. The disclosed method avoids the complex and computation-intensive problem of globally optimizing the placement of multiple images, instead, the disclosed method places images sequentially into an image collage template. As a result, the disclosed method is fast and requires less computation power than conventional techniques, which makes it suitable for a wide range of devices such as mobile phones. The disclosed method is also adaptive to different image-collage form factors and flexible with the number of images to be placed in an image collage.

Figure 7:
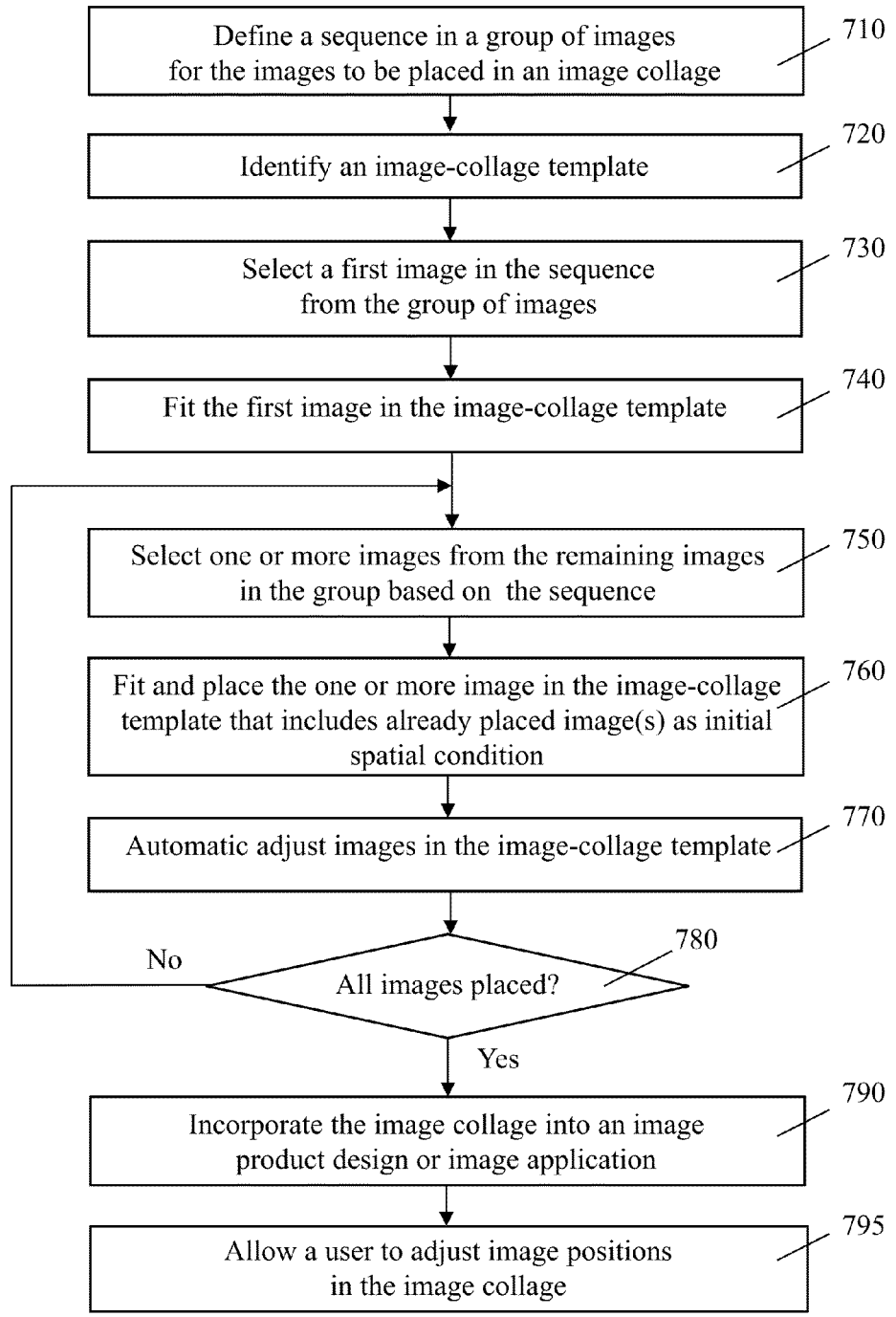
FIG. 7 shows another automated process for creating an image collage in accordance to the present invention.

The sequence that the images in a group to be placed in an image collage can be based on pre-determined criteria, as described above in relation to FIGS. 2-6. In some embodiments, referring to FIG. 7, step 710 defines a sequence in which the images are to be placed in the image collage. The sequence can be automatically defined by a computer based on a pre-determined criteria similar to the ones described in steps 230 and 250 (FIG. 2). For example, the images can be ranked according to image quality with high quality images at the beginning of the sequence. In some cases, the sequence can also be based on user preferences with the more favorite images placed at the early positions in the sequence.

While most of the steps 720-795 are similar to steps 220-295 (FIGS. 2-6), the selection of images here are based on the predefined sequence: the first image is selected from the group by picking the first in the sequence (step 730). After the first image is placed in the image collage, the next one or more images in the sequence are selected to be placed in the image collage next. Similar to step 260, the additional one or more images are placed in the image collage using the already placed images as initial conditions (step 760) to simplify computation.

It should be understood that the presently disclosed systems and methods can be compatible with different devices and image products or applications other than the examples described above.

What is claimed is:

1. A computer-implemented method for creating an image collage, comprising:
   identifying an image-collage template;
   automatically selecting, by a computer system, a first image from a group of images to be placed in the image-collage template based on one or more predetermined criteria;
   placing the first image in the image-collage template to fully occupy whole spatial area of the image-collage template;
   automatically selecting based on the one or more predetermined criteria, by the computer system, one or more additional images from the group of images;
   automatically adjusting one or more already placed images in the image-collage template by the computer system to accommodate the one or more additional images in the image-collage template, wherein the one or more already placed images comprise the first image; and
   automatically positioning the one or more additional images and the one or more already placed images contiguous with each other by the computer system to fully occupy the whole spatial area of the image-collage template, wherein an image collage is formed after all images in the group are placed in the image-collage template.

2. The computer-implemented method of claim 1, wherein the one or more predetermined criteria specify that a best fit for the first image in the image-collage template is obtained when the first image, among the group of images, has the closest aspect ratio as the image-collage template.

3. The computer-implemented method of claim 1, wherein the one or more already placed images in the image-collage template serve as an initial spatial condition for the placements of the one or more additional images.

4. The computer-implemented method of claim 1, wherein the step of occupying the whole spatial area of the image-collage template using the one or more additional images and one or more already placed images comprises cropping one or more already placed images in the image-collage template to fit the one or more additional images in the whole spatial area of the image-collage template.

5. The computer-implemented method of claim 1, further comprising:
   repeating the step of automatically selecting based on the one or more predetermined criteria, the step of automatically adjusting one or more already placed images, and the step of automatically positioning until all images in the group are placed in the image-collage template.

6. The computer-implemented method of claim 1, wherein the first image is positioned side by side relative to other one or more already placed images or the one or more additional images in the image-collage template.

7. The computer-implemented method of claim 1, wherein the step of automatic adjusting comprises:
   moving or resizing the one or more already placed images to make room for the one or more additional images in the image-collage template.

8. The computer-implemented method of claim 1, further comprising:
   adjusting images placed in the image collage in response to a user command after all images in the group are placed in the image-collage template.

9. The computer-implemented method of claim 1, further comprising:
- identifying at least one of a face or an object in the first image or the one or more additional images; and
- cropping the first image or the one or more additional images based on position and size of the face or the object before the first image is placed in the image-collage template.

10. The computer-implemented method of claim 1, wherein the one or more predetermined criteria comprise at least one of image aspect ratio, image resolution, or image qualities of the images in the group.

11. The computer-implemented method of claim 1, wherein the group of images are automatically selected by the computer system.

12. The computer-implemented method of claim 1, wherein the image-collage template is defined by dimensions of an image product or image application.

13. The computer-implemented method of claim 1, wherein the image-collage template is selected by a user.

14. The computer-implemented method of claim 1, wherein the image-collage template is automatically selected by the computer system.

15. The computer-implemented method of claim 1, wherein the computer system includes a mobile device.

16. The computer-implemented method of claim 1, further comprising:
- incorporating the image collage into an image product or an image application.

17. The computer-implemented method of claim 16, wherein the image product comprises a photobook, a photo greeting card, photo stationery, a phone case, a photo mug, an image print, a photo magnet, a photo coaster, or a photo mouse pad.

18. The computer-implemented method of claim 1, wherein the first image does not overlap with the other one or more already placed images or the one or more additional images in the image-collage template.

19. A computer-implemented method for creating an image collage, comprising:
- defining a sequence in a group of images;
- identifying an image-collage template;
- automatically selecting a first image in the sequence from the group of images by a computer system;
- placing the first image in the image-collage template by the computer system to fully occupy whole spatial area of the image-collage template;
- automatically selecting, based on the sequence, one or more additional images from the group of images;
- automatically adjusting the one or more already placed images in the image-collage template by the computer system to accommodate the one or more additional images in the image-collage template, wherein the one or more already placed images comprise the first image; and
- automatically positioning the one or more additional images and the one or more already placed images contiguous with each other by the computer system to fully occupy the whole spatial area of the image-collage template, wherein an image collage is formed after all images in the group are placed in the image-collage template.

20. The computer-implemented method of claim 19, wherein the first image is positioned side by side relative to other one or more already placed images or the one or more additional images in the image-collage template.

* * * * *